United States Patent [19]

Wiezer et al.

[11] 4,335,242
[45] Jun. 15, 1982

[54] TRIAZINE DERIVATIVES

[75] Inventors: Hartmut Wiezer, Gersthofen; Gerhard Pfahler, Augsburg, both of Fed. Rep. of Germany

[73] Assignee: Hoechst Aktiengesellschaft, Frankfurt, Fed. Rep. of Germany

[21] Appl. No.: 177,861

[22] Filed: Aug. 13, 1980

[30] Foreign Application Priority Data

Aug. 16, 1979 [DE] Fed. Rep. of Germany ....... 2933078

[51] Int. Cl.³ .................. C07D 251/50; C07D 251/70
[52] U.S. Cl. ................................... 544/198; 544/209; 524/100
[58] Field of Search ............................... 544/198, 209

[56] References Cited

U.S. PATENT DOCUMENTS

| | | | |
|---|---|---|---|
| 3,925,376 | 12/1975 | Chalmers et al. | 544/209 |
| 4,086,204 | 4/1978 | Cassandrini et al. | 544/209 |
| 4,108,829 | 8/1978 | Cassandrini et al. | 544/209 |
| 4,161,592 | 7/1979 | Evans et al. | 544/209 |
| 4,234,728 | 11/1980 | Rody et al. | 544/209 |
| 4,263,434 | 4/1981 | Cassandrini et al. | 544/198 |

*Primary Examiner*—John M. Ford
*Attorney, Agent, or Firm*—Connolly & Hutz

[57] ABSTRACT

The invention relates to polymers of triazine compounds containing piperidine groups which may serve as low volatile and migration-resistant light stabilizers for synthetic polymers. They have the structure

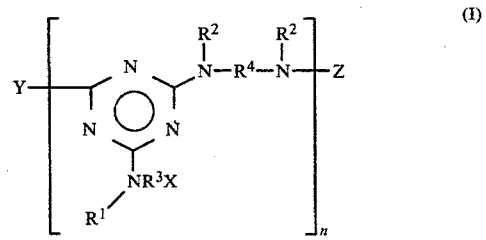

and are obtained from cyanuric halides, diamines and polyalkylpiperidylamino compounds.

2 Claims, No Drawings

TRIAZINE DERIVATIVES

The invention relates to novel triazine compounds containing piperidine groups, a process for their manufacture and their use as light stabilizers for synthetic polymers with additional antioxidative activity.

The new stabilizers can be characterized by the formula (I)

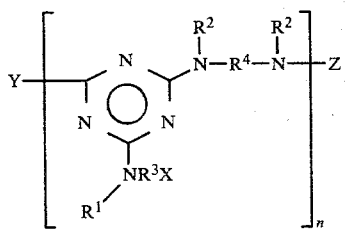

in which
n is a number of from 1 to 20, preferably 3 to 10;
$R^1$ means hydrogen or a group of the formula (II)

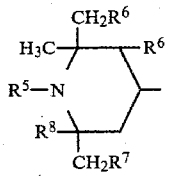

wherein
$R^5$ is hydrogen or $C_1-C_{18}$-alkyl, preferably hydrogen or $C_1-C_4$-alkyl, and especially hydrogen;
$R^6$ and $R^7$ either are identical and represent hydrogen or a $C_1-C_5$-alkyl group, preferably hydrogen, or a methyl group and especially hydrogen;
in which case
$R^8$ is a methyl group or
$R^6$ is hydrogen or $C_1-C_5$-alkyl, and
$R^7$ and $R^8$ together with the carbon atoms, to which they are bound, form a $C_5$- or $C_6$-cycloalkyl ring or a group of the formula

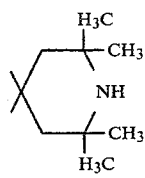

$R^2$ is hydrogen, $C_1-C_{12}$-alkyl or a group of the formula (II) preferably hydrogen or a group of the formula (II) with the proviso that at least one of the radicals $R^1$ and $R^2$ must be a group of the formula (II).
X means a hydroxyl group or a group of the formulae $-OR^9$ or $-N(R^{10})_2$;
$R^9$ standing for a $C_1-C_{18}$-alkyl group and
$R^{10}$ for a methyl or ethyl group;
$R^3$ is an alkylene group optionally substituted by a methyl group with from 2 to 4 carbon atoms in the chain, and
$R^4$ means an alkylene group with from 2 to 18, preferably 2 to 12, and especially 2 to 6 carbon atoms, a dimethylene cyclohexane, a phenylene or a $C_7-C_{13}$-aralkylene group;
Y is preferably halogen or a group of the formulae

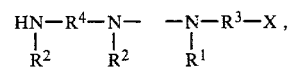

and Z stands preferably for hydrogen or the group

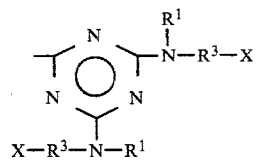

Examples of radicals in the formula (I) and (II) are:
$R^1$ = hydrogen, 2,2,6,6-tetramethyl-4-piperidyl, 2,3,6-trimethyl-2,6-diethyl-4-piperidyl, 1,2,2,6,6-pentamethyl-4-piperidyl;
$R^2$ = hydrogen, methyl, ethyl, propyl, butyl, pentyl, hexyl, 2,2,6,6-tetramethyl-4-piperidyl, 2,3,6-trimethyl-2,6-di-ethyl-4-piperidyl, 1,2,2,6,6-pentamethylpiperidyl;
$R^3$ = ethylene, propylene, butylene, 4-methylbutylene;
$R^4$ = ethylene, propylene, methylethylene, butylene, pentylene, hexylene, decylene, docecylene, phenylene, 4,4'-diphenylene-methane;
$R^5$ = hydrogen, methyl, butyl;
$R^6$ = hydrogen, methyl, ethyl;
$R^7$ = hydrogen, methyl, ethyl;
$R^8$ = methyl;
$R^9$ = methyl, ethyl, octyl, tridecyl, octadecyl.

The novel triazine stabilizers are obtained from unsubstituted or partly substituted cyanuric halides according to different manufacturing processes. In variant A, a triazine of the formula (III)

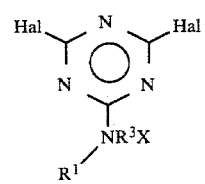

wherein Hal is halogen, preferably chlorine, and $R^1$, $R^3$ and X have the abovementioned meanings, is reacted with the 0.8 to 2.0, preferably 1,0- to 1,2-fold molar amount of a diamine of the formula (IV)

in which $R^2$ and $R^4$ have the abovementioned meanings.
Variant B is a so-called one-pot process, in which at first a cyanuric halide is reacted with the 0,8- to 1,3-fold molar, preferably equimolar amount of a compound of the formula (V)

(V)

wherein R¹, R³ and X have the abovementioned meanings, in the presence of equivalent amounts, relative to the employed compound (V), of an organic or inorganic base, and the product (III) so obtained without isolation as described under A is reacted with the diamine (IV).

According to variant C, a cyanuric halide is condensed with the 1,0- to 1,2-fold molar amount of a compound of the formula (IV) in the presence of the equivalent amount of an organic or inorganic base, and subsequently the remaining halogen atoms of the cyanuric compound are substituted by reacting them with the 1- to 1.3-, preferably 1.05- to 1.1-fold valent amount, relative to halide still present of a compound of the formula (V), with the use of equimolar amounts, too, relative to compound (V), of an organic or inorganic base. This process can also be carried out as a one-pot operation.

The reactions are performed in organic solvents, such as petroleumether, acetone, ether, dioxan, benzene, toluene, xylene, cumene or mesithylene at from 0° to 200° C. When the reaction is carried out according to variant B, the reaction of the cyanuric halide with a compound of the formula (V) is performed at a temperature of from 0° to 50° C. and the subsequent condensation with a compound of the formula (IV) at temperatures of from 50° to 200° C., preferably from 80° to 150° C.

In the process according to variant C, the reaction of the cyanuric halide with the diamine component (IV) is carried out at 20° to 150° C., preferably 40° to 80° C. and the subsequent reaction with component (V) at 50° to 200° C., preferably from 80° to 150° C.

In the manufacture of the compounds according to the invention the equivalent amounts of organic or inorganic bases are employed as hydrogen halide acceptor. Suitable bases are, for example, sodium hydroxide, potassium hydroxide, sodium carbonate, potassium carbonate and triethylamine.

Examples of dihalo-triazine intermediate compounds of the formula (III) are:

2,4-dichloro-6-[N-(2,2,6,6-tetramethyl-4-piperidyl)-3-di-methyl-amino-propylamino]-1,3,5-triazine
2,4-dichloro-6-[N-(2,2,6,6-tetramethyl-4-piperidyl)-3-diethyl-amino-propylamino]-1,3,5-triazine
2,4-dichloro-6-[N-(2,2,6,6-tetramethyl-4-piperidyl)-2-dimethyl-amino-ethylamino]-1,3,5-triazine
2,4-dichloro-6-[N-(2,2,6,6-tetramethyl-4-piperidyl)-2-diethyl-amino-ethylamino]-1,3,5-triazine
2,4-dichloro-6-[N-(2,2,6,6-tetramethyl-4-piperidyl)-4-diethyl-amino-butylamino]-1,3,5-triazine
2,4-dichloro-6-[N-(2,2,6,6-tetramethyl-4-piperidyl)-4-diethyl-amino-1-methylbutylamino]-1,3,5-triazine
2,4-dichloro-6-[N-(2,2,6,6-tetramethyl-4-piperidyl)-3-hydroxy-propylamino]-1,3,5-triazine
2,4-dichloro-6-[N-(2,2,6,6-tetramethyl-4-piperidyl)-2-methoxy-ethylamino]-1,3,5-triazine
2,4-dichloro-6-[N-(2,2,6,6-tetramethyl-4-piperidyl)-2-ethoxy-ethylamino]-1,3,5-triazine
2,4-dichloro-6-[N-(2,2,6,6-tetramethyl-4-piperidyl)-3-ethoxy-propylamino]-1,3,5-triazine
2,4-dichloro-6-[N-(2,2,6,6-tetramethyl-4-piperidyl)-3-octoxy-propylamino]-1,3,5-triazine
2,4-dichloro-6-[N-(2,2,6,6-tetramethyl-4-piperidyl)-3-tridecyl-oxypropylamino]-1,3,5-triazine
2,4-dichloro-6-[N-(2,2,6,6-tetramethyl-4-piperidyl)-3-octadecyl-oxypropylamino]-1,3,5-triazine
2,4-dichloro-6-[N-(2,3,6-trimethyl-2,6-diethyl-4-piperidyl)-3-dimethyl-aminopropylamino]-1,3,5-triazine Examples of compounds of formula (IV) are:

Ethylenediamine, 1,3-diaminopropane, 1,2-diaminopropane, 1,4-diaminobutane, 1,5-diaminopentane, 1,6-diaminohexane, 1,10-diaminodecane, 1,12-diaminododecane, p-phenylenediamine, p-xylylenediamine, 1,2-bis-(2,2,6,6-tetramethyl-4-piperidyl)-ethane, 1,6-bis-(2,2,6,6-tetramethyl-4-piperidyl)-hexane, 1,2-bis-(2,3,6-trimethyl-2,6-diethyl-4-piperidyl)-ethane.

Examples of compounds of formula (V) are:

N-(2,2,6,6-tetramethyl-4-piperidyl)-3-dimethylaminopropylamine
N-(2,2,6,6-tetramethyl-4-piperidyl)-3-diethylaminopropylamine
N-(2,2,6,6-tetramethyl-4-piperidyl)-2-dimethylaminoethylamine
N-(2,2,6,6-tetramethyl-4-piperidyl)-2-diethylaminoethylamine
N-(2,2,6,6-tetramethyl-4-piperidyl)-4-diethylaminobutylamine
(2,2,6,6-Tetramethyl-4-piperidylaminopropanol-3
N-(2,2,6,6-tetramethyl-4-piperidyl)-4-diethylamino-1-methylbutylamine
N-(2,2,6,6-tetramethyl-4-piperidyl)-2-methoxy-ethylamine
N-(2,2,6,6-tetramethyl-4-piperidyl)-2-ethoxy-ethylamine
N-(2,2,6,6-tetramethyl-4-piperidyl)-3-methoxypropylamine
N-(2,2,6,6-tetramethyl-4-piperidyl)-3-ethoxypropylamine
N-(2,2,6,6-tetramethyl-4-piperidyl)-3-octoxypropylamine
N-(2,2,6,6-tetramethyl-4-piperidyl)-3-tridecyloxypropylamine
N-(2,2,6,6-tetramethyl-4-piperidyl)-3-octadecyloxypropylamine It was not to be expected that the manufacture of the compounds of the invention could be realized in the manner as described above. Although the reaction of cyanuric acid halides with primary or secondary mono or polyamines to defined compounds or polymer triazines, which is performed according to the rules of synthesis or carboxylic acid amines from carboxylic acid chlorides, is state of the art for a certain time [J. Amer. Chem. Soc. 73, (1951), No. 7, page 2981 et sequ.; U.S. Pat. No. 2,544,071; CH-PS No. 342,784; CH-PS No. 342,787], it is known on the other hand that cyanuric acid halides, smoothly react with alcohols to give cyanuric acid esters, and therefore it was to be expected that the cyanuric acid halides, when using amino alcohols [compound (V) with X being OH], react according to the following scheme (a).

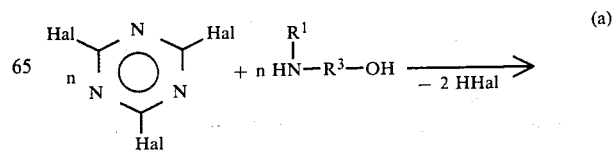

-continued

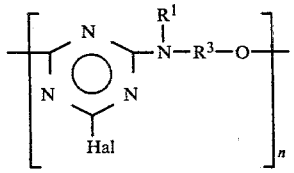

Moreover, since in the case of products with X being —OR⁹ a splitting of the ether had to be taken ino consideration because of unavoidable amounts of hydrogen halide, the reaction could also have been proceeded according to (a) after complete splitting of the ether.

Surprisingly, the reaction, however, does not proceed as expected but leads to compounds of the (IIIa) type, which are monomers for the condensation with diamines according to the invention.

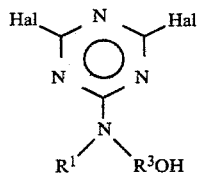
(III a)

Also according to German Offenlegungsschrift No. 2,636,144, which describes triazine stabilizers and is next comparable state of the art, in the field of stabilizers the course of the reaction (a) as outlined would have been expected.

It is known, furthermore, that carboxylic acid chlorides condense with tertiary amines, while splitting off alkyl halide (especially methylchloride) (O. Hesse, Ber. Dt. Chem. Ges. 18, p. 685) at temperatures of for example 190° C. to give carboxylic acid amines. Thus, a course of the reaction according to the following scheme (b)

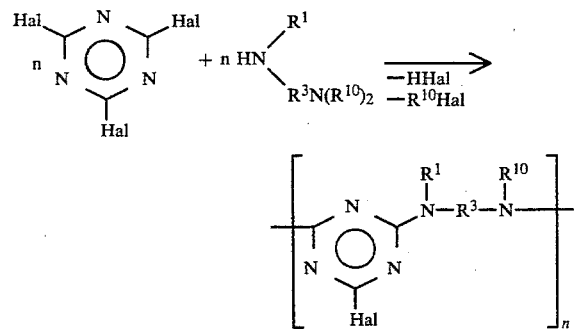

could not be excluded.

Therefore, the fact that products of the type (IIIb)

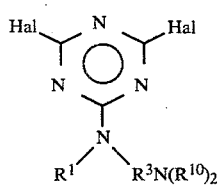
(III b)

only are obtained must be considered as not to be expected.

Since the triazine compounds according to the invention still contain terminal groups which also can be halogen, formation of alkyl halides would have been expected especially in view to the high temperatures of up to 300° C. necessary for the processing of plastics. Surprisingly, this supposition could not be confirmed.

The novel triazine stabilizers can be incorporated into the polymers to be stabilized without any problem and are excellently apt for stabilizing them. As already mentioned above, similar triazine compounds are described in German Offenlegungsschrift No. 2,636,144, which, however, still show some deficiencies.

Thus, for example, low volatility of the stabilizers, good compatibility with the polymers to be stabilized, migration resistance to water which is important for weathering in the open air, and also to hydrocarbons, as well as thermostability of the additives are of essential importance, in addition to their activity.

Hitherto no stabilizer is known which satisfactorily meets all these requirements. All usual stabilizers, even those of German Offenlegungsschrift No. 2,636,144, with respect to their aptitude as stabilizers, can only be considered as a compromise.

Therefore, it is understandable that up to now none of these products has gained importance on the market. Hitherto, only bis-(2,2,6,6-tetramethyl-4-piperidyl)-sebacate is used as light stabilizer (German Pat. No. 1,929,928 and German Offenlegungsschrift No. 2,204,659) on an industrial scale. The triazine stabilizers according to the invention are substantially free of the abovementioned disadvantages and, in addition, have an extraordinarily good stabilization activity for organic polymers.

Therefore, the compounds of formula (I) are used as stabilizers for plastics against damage by influence of oxygen, heat and light.

Examples of these plastics are:

Polymers which are derived from hydrocarbons with one or two unsaturated olefinic bonds, for example polyolefins such as polyethylene, optionally cross-linked, polypropylene, polybutene-1, polyisobutene, polymethylbutene-1, polymethylpentene-1, polyisoprene, polybutadiene, polystyrene, copolymers of the monomers on which the abovementioned homopolymers are based, such as ethylene/propylene copolymers, propylene/butene-1 copolymers, propylene/isobutene copolymers, styrene/butadiene copolymers, as well as terpolymers of ethylene and propylene with a diene, such as hexadiene, dicyclopentadiene or ethylidene-norbornene, mixtures of the abovementioned homopolymers, for example mixtures of polypropylene and polyethylene, polypropylene and polybutene-1, polypropylene and polyisobutylene, or of a butadiene/acrylonitrile copolymer with a styrene/-butadiene copolymer.

Vinyl polymers containing halogen, such as polyvinyl chloride, polyvinylidene chloride, polyvinyl fluoride, polychloroprene and chlorinated rubber, as well as copolymers of vinyl chloride and vinylidene chloride with one another and with other olefinically unsaturated monomers.

Polymers derived from α,β-unsaturated acids and their derivatives, such as polyacrylates, popylmethacrylates, polyacrylamides and polyacrylonitriles, as well as their copolymers with one another and with other vinyl compounds, for example acrylonitrile/butadiene/styrene, acrylonitrile/styrene and acrylonitrile/styrene/acrylic ester copolymers.

Polymers which are derived from unsaturated alcohols and amines or their acyl derivatives or acetals, such as polyvinyl alcohols, polyvinyl acetate, polyvinyl stearate, polyvinyl benzoate, polyvinyl maleate, polyvinyl butyral, polyallyl phthalate, polyallyl melamine and their copolymers with other vinyl compounds, such as ethylene/vinyl acetate copolymers.

Homopolymers and copolymers which are derived from epoxides, such as polyethylene oxide or polymers derived from bisglycidyl ethers.

Polyacetals, such as polyoxymethylene and polyoxyethylene, as well as those polyoxymethylenes which contain ethylene oxide as comonomer.

Polyurethane and polyureas.

Polycarbonates.

Polyamines and copolyamides derived from diamines and dicarboxylic acids and/or from aminocarboxylic acids or the corresponding lactams, such as polyamide 6, polyamide 6/6, polyamine 6/10, polyamide 11, polyamine 12.

Polyesters derived from dicarboxylic acids and diols and/or from hydroxy carboxylic acids or from the corresponding lactones, such as polyethylene glycols terephthalate, polybutyleneterephthalate, poly-1,4-dimethylol-cyclohexaneterephthalate, as well as their starting materials, for example low terephthalic acid alkyl esters.

Cross-linked polymers which on the one hand are derived from aldehydes and on the other hand from phenols, ureas and melamines, such as phenol/formaldehyde and melamine/formaldehyde resins.

Of special importance is the stabilization of polyolefins, styrene polymers, polyamides, poly-(meth-)acrylates and of polyurethanes, for which the novel compounds are especially suitable. Examples thereof are polyethylene of higher and lower density, polypropylene, ethylene/propylene copolymers, polystyrene, styrene/butadiene/acrylonitrile terpolymers, mixtures of polyolefins or of styrene polymers, polyurethanes on the basis of polyether or polyester in the form of lacquers, fibers, sheets, plates, films, elastomers or foam plastics.

The new stabilizers are incorporated into the polymer masses according to the methods generally used. The incorporation can be carried out, for example, by intermixing the compounds and optionally other additives with the melt according to the methods usual in the industrial practice, before or during shaping, or also by applying the dissolved or dispersed compounds directly to the polymer, or by intermixing them with a solution, suspension or emulsion of same, optionally with subsequently allowing the solvent to evaporate. The amounts are from 0.01 to 5, preferably 0.05 to 2.5, and especially 0.1 to 1.0% by weight, relative to the material to be stabilized. The new compounds can also be added to the plastics to be stabilized in the form of a masterbatch containing these compounds, for example in a concentration of from 2.5 to 50, preferably 5.0 to 20, % by weight.

The plastics stabilized by addition of substances of formula (I) may contain other known and usual additives, such as antioxidants based on phenol and sulfide, UV absorbers and light protecting agents, phosphite stabilizers, metal compounds, epoxy stabilizers and polyols.

Examples of antioxidants are those of the type of sterically hindered phenols, such as 4,4'-butylidene-bis-(2,6-di-t.-butyl-phenol), 4,4'-thio-bis-(2-t.-butyl-5-methylphenol), phenolic triazine compounds, thiodipropionic acid esters of fatty alcohols, dioctadecyl sulfide and -disulfide.

The UV-absorbers and light protecting agents include, for example, 2-(2-hydroxyphenyl)-benzotriazoles, such as 2-(2'-hydroxy-5'-methylphenyl)-benzotriazole, 2-hydroxybenzophenones, such as 2-hydroxy-4-octoxy-benzophenone, stabilizers of the group of the salicylates, such as octylphenyl salicylate, nickel chelates, oxalic acid diamides and sterically hindered piperidine compounds.

As phosphites there are to be mentioned trisnonylphenyl phosphite, trislauryl phosphite or esters of pentaerythritol phosphite.

By metal compounds known as stabilizers there are to be understood: Calcium, barium, strontium, zinc, cadmium, magnesium, aluminum and lead soaps of aliphatic carboxylic acids or hydroxycarboxylic acids having about 12 to 32 carbon atoms, salts of the aforesaid metals with aromatic carboxylic acids, such as benzoates or salicylates, and (alkyl-)phenolates of these metals, and also organo-tin compounds such as, for example, dialkyltin thioglycolates and carboxylates.

Known epoxy stabilizers are, for example, epoxidized higher fatty acids, such as epoxidized soy bean oil, tall oil, linseed oil or epoxidized butyl oleate, and also epoxides of long-chain olefins.

Polyols may be, for example, pentaerythritol, trimethylolpropane, sorbitol or mannitol, i.e. preferably alcohols having 5 or 6 carbon atoms and 3 to 6 OH-groups.

An effective stabilizer combination for poly-$\alpha$-olefins such as, for example, high, medium and low pressure polymers of $C_2$- to $C_4$-$\alpha$-olefins, especially polyethylene and polypropylene or copolymers of such $\alpha$-olefins, consists, calculated on 100 parts by weight of polymer, for example, of from 0.01 to 5 parts by weight of one of the compounds to be used in accordance with the invention, of from 0.05 to 5 parts by weight of a phenolic stabilizer, optionally of from 0.01 to 5 parts by weight of a sulfur-containing costabilizer, and optionally of from 0.01 to 3 parts by weight of a basic or neutral metal soap such as, for example, calcium stearate or zinc stearate, and optionally of from 0.1 to 5 parts by weight of a phosphite and optionally of from 0.01 to 5 parts by weight of a known UV-stabilizer of the group of alkoxy-hydroxybenzophenones, 4-hydroxyphenyl-benzotriazoles, benzylidene-malonic acid-mononitrile esters or the so-called quenchers, such as nickel chelates.

The plastics according to the invention can be used in most different shapes, for example as sheets, fibers, ribbons, profiles, or as binders for lacquers, adhesives or cements.

The following examples illustrate the invention.

EXAMPLE 1

26.9 g (0.1 mol) of 1-(2,2,6,6-tetramethyl-4-piperidylamino)-3-diethyl-aminopropane (monofunctional component) 10 g of pulverized sodium hydroxide and 50 ml of absolute toluene are introduced into the reactor. Within 20 minutes a solution of 14.7 g (0.08 mol) of cyanuric chloride in 50 ml of absolute toluene is added dropwise at 20° C. Stirring is continued for 7 hs at 20° C. and subsequently a solution of 4.8 g (0.08 mol) of ethylene diamine (bifunctional component) in 50 ml of absolute toluene is added slowly. The resulting reaction mixture is stirred for 7 hours at 70° to 75° C., the precipitate is filtered off and the filtrate is concentrated in a rotary evaporator. The remaining resin is mixed with 100 ml of distilled water in a laboratory mixer, suction-filtered and dried. The resin has a reduced specific viscosity of 0.07, measured in a 1% by weight solution in chloroform at 25° C.

Molecular weight: 1100

EXAMPLES 2 to 9

The reaction was carried out according to Example 1 with other bifunctional components.

| Example | Bifunctional Component (amount) | Monofunctional Component (amount) | RSV value[1] |
|---|---|---|---|
| 2 | hexamethylenediamine (9.3 g 0.08 mol) | acc. to Example 1 | 0.09 |
| 3 | 1,2-bis-(2,2,6,6-tetramethyl-4-piperidylamino)-ethane (27.0 g 0.08 mol) | " | 0.06 |
| 4 | 1,6-bis-(2,2,6,6-tetramethyl-4-piperidylamino)-hexane (31.5 g 0.08 mol) | " | 0.06 |
| 5+ | ethylenediamine (4.8 g 0.08 mol) | 1-(2,2,6,6-Tetramethyl-4-piperidylamino)-3-dimethyl-aminopropane (24.1 g 0.1 mol) | 0.07 |
| 6+ | hexamethylenediamine (9.3 g 0.08 mol) | 1-(2,2,6,6-Tetramethyl-4-piperidylamino)-3-dimethyl-aminopropane (24.1 g 0.1 mol) | 0.08 |
| 7+ | 1,6-bis-(2,2,6,6-tetramethyl-4-piperidylamino)-hexane (31.5 g 0.08 mol) | 1-(2,2,6,6-Tetramethyl-4-piperidylamino)-3-dimethyl-aminopropane (24.1 g 0.1 mol) | 0.09 |
| 8+ | 1,2-bis-(2,2,6,6-tetramethyl-4-piperidylamino)-ethane (27.0 g 0.08 mol) | 1-(2,2,6,6-Tetramethyl-4-piperidylamino)-3-dimethyl-aminopropane (24.1 g 0.1 mol) | 0.08 |
| 9++ | 4,4'-Diaminodiphenylmethane (15.8 g 0.06 mol) | 1-(2,2,6,6-Tetramethyl-4-piperidylamino)-3-dimethyl-aminopropane (24.1 g 0.1 mol) | 0.15 |

+additionally 7 hs at 95 to 105° C.
++5 hs stirred at 105° C.
[1]1% by weight solution in CHCl₃, measured at 25° C.

EXAMPLE 10

29.7 g (0.1 mol) of 1-(2,2,6,6-tetramethyl-4-piperidylamino)-1-methyl-4-diethylaminobutane (monofunctional component) and 4 g (0.1 mol) of pulverized sodium hydroxide are introduced into 100 ml of absolute xylene. At 20° C. a solution of 18.5 g (0.1 mol) of cyanuric chloride and 50 ml of absolute xylene is added dropwise. The mixture is stirred for 10 hours at 20° C. and subsequently 8.4 g (0.21 mol) of sodium hydroxide and a solution of 12.2 g (0.205 mol) of hexamethylenediamine and 50 ml of absolute xylene are added. Stirring is continued for 16 hours under reflux. The precipitate is filtered off and the filtrate is concentrated in a rotary evaporator. Subsequently the batch is purified as explained in Example 1.

Resin with RSV value of 0.07.

EXAMPLES 11 TO 16

The reactions are carried out according to Example 10.

| Example | Bifunctional Component (amount) | Monofunctional Component (amount) | RSV value[1] |
|---|---|---|---|
| 11 | 1,2-bis-(2,2,6,6-tetramethyl-4-piperidylamino)-ethane (38.1 g 0.105 mol) | acc. to Example 10 | 0.04 |
| 12 | 1,6-bis-(2,2,6,6-tetramethyl-4-piperidylamino)-hexane (41.4 g 0.105 mol) | " | 0.04 |
| 13 | ethylenediamine (6.3 g 0.105 mol) | " | 0.03 |
| 14+ | 1,3-bis-(2,2,6,6-tetramethyl-4-piperidylaminomethyl)-cyclohexane (21.3 g 0.105 mol) | Example 1 | 0.04 |
| 15+ | 1,3-bis-aminomethylcyclohexane (21.3 g 0.105 mol) | " | 0.05 |
| 16+ | 4,4'-bis-aminocyclohexyl-methane (31.5 g 0.15 mol) | " | 0.06 |

EXAMPLE 17

26.9 g (0.1 mol) of 1-(2,2,6,6-tetramethyl-4-piperidylamino)-3-diethyl-aminopropane and 4 g (0.1 mol) of NaOH are introduced into 100 ml of xylene. At 20° C. a solution of 18.5 g (0.1 mol) of cyanuric chloride in 100 ml of xylene is added dropwise. Stirring of the reaction mixture is continued for 7 hours. Subsequently, another 8.4 g (0.21 mol) of NaOH are added, a solution of 6.3 g (0.105 mol) of ethylenediamine is added dropwise, and the resulting reaction mixture is refluxed for 16 hours with stirring. After cooling the NaCl is separated and the xylene solution is concentrated in a rotary evaporator.

A light resin with a reduced specific viscosity of 0.05 (measured on a 1% solution on chloroform at 25° C.) is obtained.

EXAMPLES 18 TO 37

The reaction was carried out according to Example 17.

| Example | Bifunctional Component (amount) | Monofunctional Component (amount) | RSV value[1] |
|---|---|---|---|
| 18 | 1,3-diaminopropane (7.8 g  0.105 mol) | acc. to Example 10 | 0.06 |
| 19 | 1,6-diaminohexane (12.2 g  0.105 mol) | " | 0.09 |
| 20 | 1,2-bis-(2,2,6,6-tetramethyl-4-piperidylamino)-ethane (35.5 g  0.105 mol) | " | 0.06 |
| 21 | 1,6-bis-(2,2,6,6-tetramethyl-4-piperidylamino)-hexane (41.4 g  0.105 mol) | " | 0.13 |
| 22+ | 1,2-diaminoethane (6.3 g  0.105 mol) | 1-(2,2,6,6-tetramethyl-4-piperidylamino)-2-ethoxy-propane (24.2 g  0.1 mol) | 0.06 |
| 23+ | 1,6-diaminohexane (12.2 g  0.105 mol) | 1-(2,2,6,6-tetramethyl-4-piperidylamino)-2-ethoxy-propane (24.2 g  0.1 mol) | 0.13 |
| 24 | 1,6-diaminohexane (12.2 g  0.105 mol) | 1-(2,2,6,6-tetramethyl-4-piperidylamino)-propanol-3 (21.4 g  0.1 mol) | 0.09 |
| 25+ | 1,2-diaminoethane (6.3 g  0.105 mol) | 1-(2,2,6,6-tetramethyl-4-piperidylamino)-3-(2-ethyl-hexoxy)-propane (32.6 g  0.1 mol) | 0.05 |
| 26+ | 1,6-diaminohexane (12.2 g  0.105 mol) | 1-(2,2,6,6-tetramethyl-4-piperidylamino)-3-(2-ethyl-hexoxy)-propane (32.6 g  0.1 mol) | 0.11 |
| 27+ | 1,2-diaminoethane (6.3 g  0.105 mol) | 1-(2,2,6,6-tetramethyl-4-piperidylamino)-2-methoxy-propane (22.8 g = 0.1 mol) | 0.21 |
| 28+ | 1,6-diaminohexane (12.2 g  0.105 mol) | 1-(2,2,6,6-tetramethyl-4-piperidylamino)-3-methoxy-propane (22.8 g  0.1 mol) | 0.11 |
| 29+ | 1,6-bis-(2,2,6,6-tetramethyl-4-piperidylamino)-hexane (41.4 g  0.105 mol) | 1-amino-3-stearyloxypropane (32.7 g  0.1 mol) | 0.07 |
| 30 | 1,2-diaminoethane (6.3 g  0.105 mol) | 1-(2,2,6,6-tetramethyl-4-piperidylamino)-2-diethyl-amino-ethane (25.5 g  0.1 mol) | 0.10 |
| 31 | 1,3-diaminopropane (7.8 g  0.105 mol) | 1-(2,2,6,6-tetramethyl-4-piperidylamino)-2-diethyl-amino-ethane (25.5 g  0.1 mol) | 0.10 |
| 32 | 1,6-diaminohexane (12.2 g  0.105 mol) | 1-(2,2,6,6,-tetramethyl-4-piperidylamino)-2-diethyl-amino-ethane (25.5 g  0.1 mol) | insoluble |
| 33 | 1,2-(2,2,6,6-tetramethyl-4-piperidylamino)-hexane (35.5 g  0.105 mol) | 1-(2,2,6,6-tetramethyl-4-piperidylamino)-2-diethyl-amino-ethane (25.5 g  0.1 mol) | 0.08 |
| 34 | 1,6-bis-(2,2,6,6-tetramethyl-4-piperidylamino)-hexane (41.5 g  0.105 mol) | 1-(2,2,6,6-tetramethyl-4-piperidylamino)-2-diethyl-amino-ethane (25.5 g  0.1 mol) | 0.13 |
| 35 | 1,6-bis-(2,2,6,6-tetramethyl-4-piperidylamino)-hexane (41.5 g  0.105 mol) | 1-(2,2,6,6-tetramethyl-4-piperidylamino)-2-dimethylami-no-ethane (22.7  0.1 mol) | 0.14 |
| 36 | 1,3-diaminopropane (7.8 g  0.105 mol) | 1-(2,2,6,6-tetramethyl-4-piperidylamino)-4-diethylami-no-hexane (28.3 g  0.1 mol) | insoluble |
| 37 | 1,6-bis-(2,2,6,6-tetramethyl-4-piperidylamino)- | 1-(2,2,6,6-tetramethyl-4-piperidylamino)-4-diethylami- | 0.08 |

| Example | Bifunctional Component (amount) | | Monofunctional Component (amount) | | RSV value[1] |
|---|---|---|---|---|---|
| | hexane | | no-hexane | | |
| | (41.4 g | 0.105 mol) | (28.3 g | 0.1 mol) | |

[+] toluene as solvent
[1] 1% solvent in CHCl$_3$ at 25° C.

EXAMPLE 38

18.5 g (0.1 mol) of cyanuric chloride were introduced into 100 ml of xylene. At 20° C., a solution of 39.4 g (0.1 mol) of 1,6-bis-(2,2,6,6-tetramethyl-4-piperidylamino)-hexane in 100 ml of xylene was added dropwise. Subsequently, 8 g (0.2 mol) of NaOH were added and then the batch was stirred for 14 hours at 25° C.

Next, another 4 g (0.1 mol) of NaOH were added and a solution of 24.1 g (0.1 mol) of 1-(2,2,6,6-tetramethyl-4-piperidylamino)-3-dimethylaminopropane in 50 ml of xylene was added dropwise and subsequently the batch was refluxed for 9 hours.

Working up analogous to Example 1.
RSV value of the triazine resin 0.18.

EXAMPLE 39

18.4 g (0.1 mol) of cyanuric chloride in 100 ml of acetone were introduced into an apparatus provided with stirrer, and a solution of 24.1 g (0.1 mol) of 1-(2,2,6,6-tetramethyl-4-piperidylamino)-3-dimethylaminopropane in 80 ml of acetone was added dropwise at 0° C. Dropwise addition being complete, 4 g of NaOH, dissolved in 40 ml of water, were added and stirring was continued for 5 hours. The batch was suction-filtered, washed with water and dried. The 2,4-dichloro-6-N-(2,2,6,6-tetramethyl-4-piperidyl)-3-dimethylamino-propylamino-1,3,5-triazine obtained melts at 250° C.

For further processing, 23 g (0.05 mol) of this product were refluxed with 3 g (0.05 mol) of 1,2-diaminoethane and 4 g (0.1 mol) of NaOH in 100 ml of toluene with stirring for 10 hs. Subsequently, work-up was carried out according to Example 17, and a light resin was obtained.

RSV-value 0.02.

EXAMPLE 40

This example shows the volatility of the triazine stabilizers according to the invention in comparison with product 6 according to German Offenlegungsschrift No. 2,636,144.

The volatility values were determined in a device for thermogravimetric analysis. To this end equal amounts (500 mg) of the copolymers according to the invention and the comparative substances were heated to 300° C. in a nitrogen atmosphere at a heating speed of 2K/min and the loss of substances was measured in mg/cm$^2$ surface. The results are shown in the following table:

| Polymer according to Example | Loss of weight in mg/cm$^2$ at reaching °C. | | | |
|---|---|---|---|---|
| | 220 | 260 | 300 | 10 min at 300 |
| 2 | 0.03 | 1.58 | 5.37 | 9.48 |
| 5 | 0.02 | 1.42 | 4.90 | 7.74 |
| 3 | 0.16 | 2.37 | 6.84 | 11.69 |
| 6 | 0.01 | 1.11 | 3.79 | 5.37 |
| 8 | 0.02 | 0.63 | 3.63 | 5.69 |

| Polymer according to Example | Loss of weight in mg/cm$^2$ at reaching °C. | | | |
|---|---|---|---|---|
| | 220 | 260 | 300 | 10 min at 300 |
| Comparison(+) | 0.47 | 3.48 | 10.59 | 17.38 |

(+) Stabilizer according to Example 6 of German Offenlegungsschrift no. 2,636,144.

EXAMPLE 41

100 parts by weight of polypropylene with a melt flow index i$_5$ of about 6 g/10 min (determined according to ASTM D 1238-62 T) and a density of 0.90 were mixed with 0.1 parts by weight of pentaerythril-tetrakis-3-(3,5-ditertiarybutyl-4-hydroxyphenyl)-propionate
0.2 parts by weight of calcium stearate and
0.3 parts by weight of the stabilizer according to the invention to be examined.

In order to obtain a distribution as regular as possible on the polymer grain, the stabilizers were dissolved in a solvent and the solution was added dropwise to the polypropylene powder with stirring, while the main part of the solvent was evaporated simultaneously by radiation with an IR lamp. After approximately 20 min the calcium stearate was added and mixing was continued for another 10 min. Remaining solvent was removed by drying at 50° C./120 min in a drying cabinet. The polypropylene was molded on a Windsor injection molding machine type SP 50 at 240° C. to 60×60×1 mm plates. From these plates there were cut test specimens according to German Industrial Standard DIN No. 53 455, form 3, in reduced scale of 1:3. The test specimens necessary for comparison were manufactured analogously, but without the stabilizer to be tested or with addition of the comparative stabilizers.

For testing the stability to light, the specimens were subjected to radiation of changing intensity in a Xenotest-1200 apparatus of the company Original Hanau Quartzlampen GmbH. The radiation intensity was modified by UV filters (special filter glass d = 1.7 mm). Light stability was tested according to DIN No. 53 387 (17 min moistening, 3 min sprinkling, black panel temperature 45° C., atmospheric moisture 70 to 75%). After a defined time of exposure in hours, the elongation at break was determined on a tensile testing machine of the Instron company at a draw-off speed of 5 cm/min.

| Stabilizer according to Example | Time of exposure in hours | elongation at break in % of the initial value |
|---|---|---|
| 2 | 1400 | >50 |
| 3 | 1400 | >50 |
| 5 | 1400 | >50 |
| 6 | 1400 | >50 |
| 8 | 1400 | >50 |
| Polypropylene comparison (without stabilizer) | 260 | 1 |
| | 320 | 1 |

| Stabilizer according to Example | Time of exposure in hours | elongation at break in % of the initial value |
|---|---|---|
| comparison(+) | 1400 | <50 |

(+)Stabilizer according to Example 6 of German Offenlegungsschrift no. 2,636,144

EXAMPLE 42

0.1 to 0.25 Part by weight of the stabilizers indicated in Example 41 are mixed by means of a laboratory high-speed mixer with polypropylene (Hostalen PPU VP 1770 F) having a melt flow index MFI 190/51.9 g/min according to German industrial standard. The material so stabilized was melted in a laboratory extruder under the usual processing conditions and processed via a spinning pump with spinneret to give monofilaments (87 dtex) which subsequently were after-drawn in a ratio of 1:2.5. Every 24 of these filaments were texturized to give yarns which were processed to test fabrics. The test materials were subjected to a light fastness test in a fadeo-meter and after the indicated time of exposure subjected to the finger nail test (light rubbing with the thumb nail over the fabric).

After 160 hours of time of exposure to light, the test fabrics stabilized with the compounds according to the invention did not show any damage.

What is claimed is:

1. Triazine compounds of the formula (I)

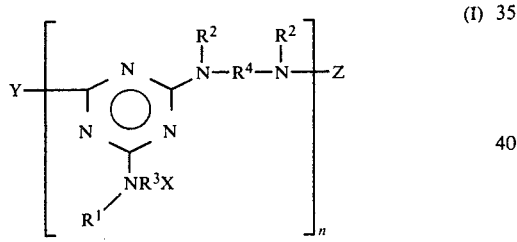

(I)

in which
  n is a number of from 1 to 20, preferably 3 to 10;
  $R^1$ means hydrogen or a group of the formula (II)

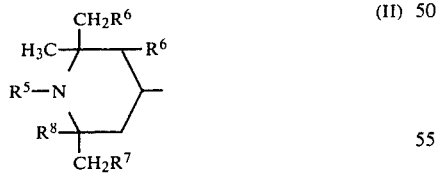

(II)

wherein
  $R^5$ is hydrogen or $C_1-C_{18}$-alkyl,
  $R^6$ and $R^7$ either are identical and represent hydrogen or a $C_1-C_5$-alkyl group,
in which case
  $R^8$ is a methyl group, or
  $R^6$ is hydrogen or $C_1-C_5$-alkyl; and
  $R^7$ and $R^8$ together with the carbon atoms, to which they are bound, form a $C_5$- or $C_6$-cycloalkyl ring or a group of the formula

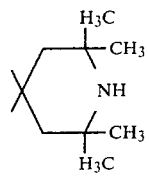

$R^2$ is hydrogen, $C_1-C_{12}$-alkyl or a group of the formula (II), with the proviso that at least one of the radicals $R^1$ and $R^2$ must be a group of the formula (II);

X means a hydroxyl group or a group of the formulae $-OR^9$ or $-N(R^{10})_2$;

$R^9$ standing for a $C_1-C_{18}$-alkyl group and $R^{10}$ for a methyl or ethyl group;

$R^3$ is an alkylene group with from 2 to 4 carbon atoms in the chain, and $R^4$ means an alkylene group with from 2 to 18 carbon atoms, a dimethylene cyclohexane, a phenylene or a $C_7-C_{13}$-aralkylene group;

Y is preferably halogen or a group of the formulae

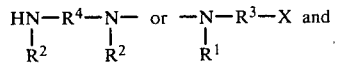

Z stands preferably for hydrogen or the group

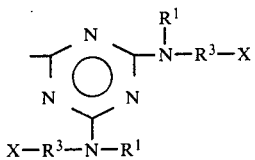

2. Process for the manufacture of the compounds according to claim 1, which comprises reacting either (A) a compound of the formula (III)

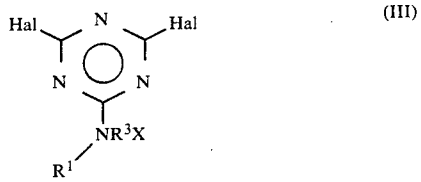

(III)

wherein Hal is halogen and $R^1$, $R^3$ and X have the meanings indicated in claim 1, in an inert organic solvent at a reaction temperature of from 50° to 200° C. with a 0.8- to 2.0-fold molar amount of a compound of the formula (IV)

(IV)

in the presence of an equivalent amount relative to compound (IV) of a base; or (B) at first allowing compound (III) to form by reacting cyanuric halide with the 0.8- to 1.3-fold molar amount of a compound of formula (V)

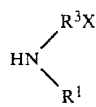 (V)
in an inert organic solvent, using an equivalent amount of base, relative to compound (V), as catalyst and then adding the compound (IV), or (C) reacting a cyanuric halide with the 1.0- to 1.2-fold molar amount of a compound of formula (IV) to form compound (VI)
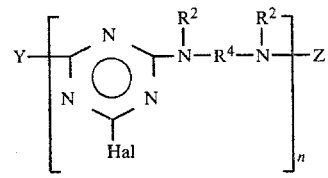 (VI)
and reacting the halogen atoms of this with the equimolar amount of a compound of formula (V).
* * * * *